US012679147B2

(12) United States Patent
Ogihara et al.

(10) Patent No.: US 12,679,147 B2
(45) Date of Patent: Jul. 14, 2026

(54) TIRE

(71) Applicant: Sumitomo Rubber Industries, Ltd.,
Kobe (JP)

(72) Inventors: Sawa Ogihara, Kobe (JP); Ryuhei Sanae, Kobe (JP); Ken Miyazawa, Kobe (JP); Tatsuya Sasaki, Kobe (JP); Naoto Oishi, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 145 days.

(21) Appl. No.: 18/119,558

(22) Filed: Mar. 9, 2023

(65) Prior Publication Data

US 2023/0311577 A1 Oct. 5, 2023

(30) Foreign Application Priority Data

Mar. 29, 2022 (JP) ................................. 2022-054342

(51) Int. Cl.
B60C 11/03 (2006.01)
B60C 11/12 (2006.01)

(52) U.S. Cl.
CPC ...... B60C 11/1204 (2013.01); B60C 11/0302 (2013.01); B60C 11/0304 (2013.01); (Continued)

(58) Field of Classification Search
CPC ............. B60C 11/1236; B60C 11/0332; B60C 11/1281; B60C 2011/1213; B60C 2011/0372
See application file for complete search history.

(56) References Cited

U.S. PATENT DOCUMENTS

| | | | | | |
|---|---|---|---|---|---|
| 5,924,464 | A | * | 7/1999 | White ................. | B60C 11/0306 152/DIG. 3 |
| 2016/0297253 | A1 | * | 10/2016 | Bonnamour ........ | B60C 11/0332 |
| 2017/0057298 | A1 | * | 3/2017 | Li ........................ | B60C 11/1272 |

FOREIGN PATENT DOCUMENTS

| | | | | | | |
|---|---|---|---|---|---|---|
| EP | | 391300 | A | * | 10/1990 | ............. B60C 11/00 |
| JP | | 60-148702 | A | * | 8/1985 | |

(Continued)

OTHER PUBLICATIONS

Machine translation for Japan 2002-046426 (Year: 2024).*
(Continued)

*Primary Examiner* — Steven D Maki
(74) *Attorney, Agent, or Firm* — Birch, Stewart, Kolasch & Birch, LLP

(57) ABSTRACT

A tread portion includes a land portion provided with lateral groove-shaped elements arranged in a first array. Each lateral groove-shaped element extends from a first end to a second end. In the first array, the second end of one of the lateral groove-shaped elements is located at the circumferential same position as the first end of another of the lateral groove-shaped elements. Each lateral groove-shaped elements includes a first portion on the first end side, a second portion on the second end side, and a third portion therebetween. The first, second, and third portions are inclined in the same direction. An angle $\theta 3$ of the third portion to the tire circumferential direction is smaller than angles $\theta 1$ and $\theta 2$ of the first and second portions, and a length of the third portion is greater than a sum of lengths of the first and second portions.

14 Claims, 8 Drawing Sheets

(52) U.S. Cl.
CPC ...... *B60C 11/0332* (2013.01); *B60C 11/1236*
(2013.01); *B60C 11/1281* (2013.01); *B60C*
*2011/0341* (2013.01); *B60C 2011/0372*
(2013.01); *B60C 2011/1213* (2013.01)

(56) References Cited

FOREIGN PATENT DOCUMENTS

| | | | | | |
|---|---|---|---|---|---|
| JP | 61-202901 | A | * | 9/1986 | |
| JP | 02-197402 | A | * | 8/1990 | ............. B60C 11/12 |
| JP | 2002-046426 | A | * | 2/2002 | |
| JP | 2005-289122 | A | * | 10/2005 | ......... B60C 11/0306 |
| JP | 2016-088284 | A | * | 5/2016 | |
| JP | 2019-182338 | A | * | 10/2019 | |
| JP | 2020-168946 | A | | 10/2020 | |

OTHER PUBLICATIONS

Machine translation for Japan 2016-088284 (Year: 2024).*
Machine translation for Japan 02-197402 (Year: 2024).*
Machine translation for Japan 2019-182338 (Year: 2024).*
Machine translation for Japan 2005-289122 (Year: 2025).*
Machine translation for Japan 60-148702 (Year: 2025).*
Machine translation for Japan 61-202901 (Year: 2025).*

* cited by examiner

TIRE

RELATED APPLICATIONS

This application claims the benefit of foreign priority to Japanese Patent Application No. JP2022-054342, filed Mar. 29, 2022, which is incorporated by reference in its entirety.

FIELD OF THE DISCLOSURE

The present disclosure is related to a tire.

BACKGROUND OF THE DISCLOSURE

In general, tread portions of tires are provided with sipes or lateral grooves extending in the tire axial direction from the viewpoint of drainage performance (for example, see Patent Document 1 below).

PATENT DOCUMENT

Patent Document 1

Japanese Unexamined Patent Application Publication 2020-168946

SUMMARY OF THE DISCLOSURE

In recent years, as automobiles have become more sophisticated and quieter, there has been a growing demand for tires with improved steering stability and noise performance. On the other hand, sipes and lateral grooves reduce the rigidity of the tread portion and generate various noises during driving. Thus, it is necessary to consider the noise performance and steering stability when forming sipes and lateral grooves on tire treads.

The present disclosure has been made in view of the above circumstances and has a major object to provide a tire capable of improving steering stability while limiting deterioration of noise performance.

In one aspect of the present disclosure, a tire includes a tread portion including at least one land portion, wherein the a least one land portion includes a circumferentially extending first edge, a circumferentially extending second edge, and at least one set of plurality of lateral groove-shaped elements, each of the plurality of lateral groove-shaped elements extends continuously from a first end thereof located on the first edge to a second end thereof located on the second edge and is inclined with respect to a tire axial direction and a tire circumferential direction, the at least one set of the plurality of lateral groove-shaped elements is arranged in a first array over an entire circumference of the at least one land portion, in the first array, the plurality of lateral groove-shaped elements is arranged repeatedly in the tire circumferential direction such that the second end of one of the lateral groove-shaped elements is located at a same position in the tire circumferential direction as the first end of another of the lateral groove-shaped elements, each of the plurality of lateral groove-shaped elements includes a first portion on a first end side, a second portion on a second end side, and a third portion between the first portion and the second portion, the first portion, the second portion, and the third portion are inclined in a same direction with respect to the tire circumferential direction, an angle $\theta 3$ of the third portion with respect to the tire circumferential direction is smaller than an angle $\theta 1$ and an angle $\theta 2$ of the first and second portions, respectively, with respect to the tire circumferential direction, and a length of the third portion is greater than a sum of a length of the first portion and a length of the second portion.

DETAILED DESCRIPTION OF THE DISCLOSURE

Figure 1:
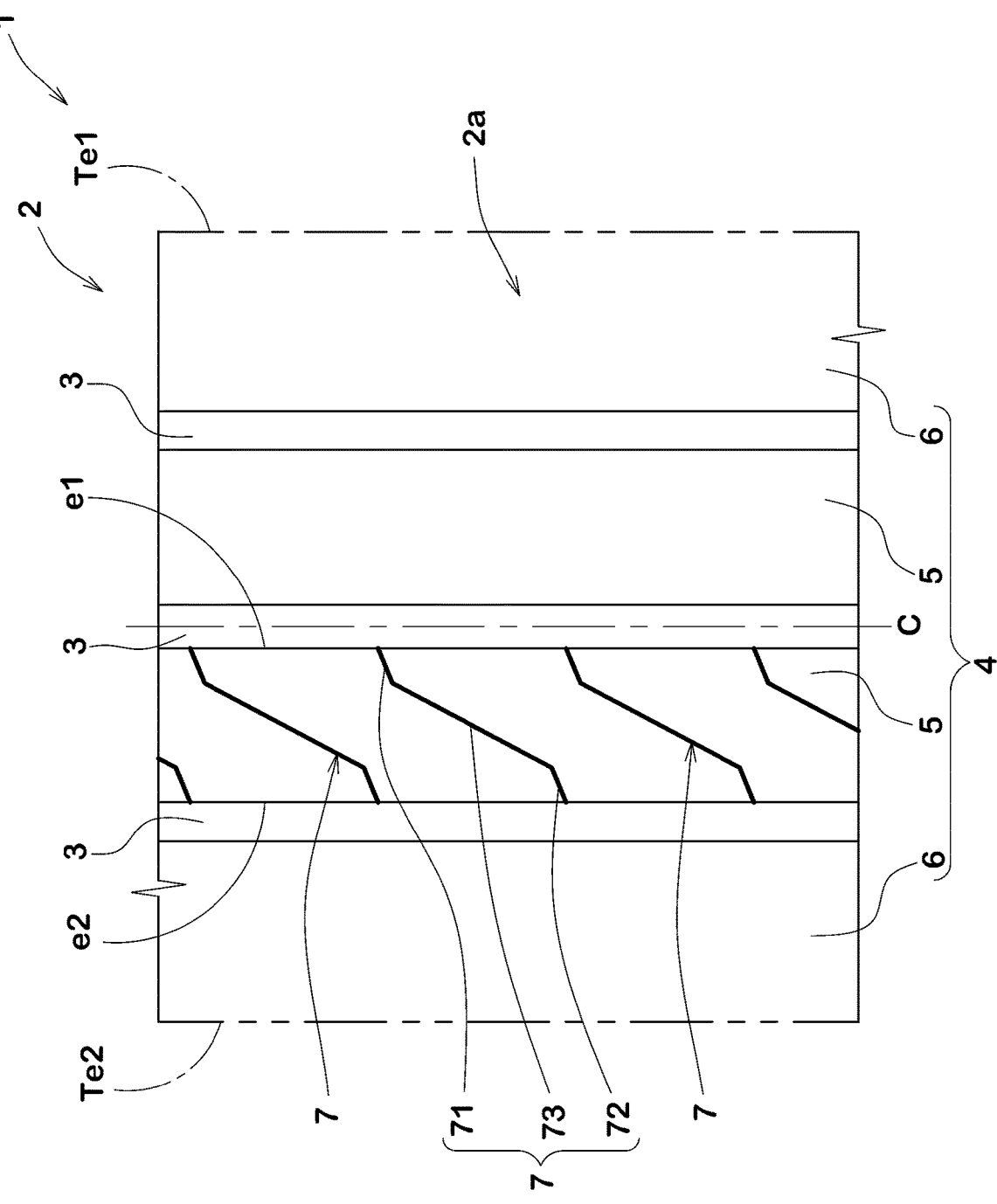
FIG. 1 is a partial development view of a tread portion of a tire in accordance with an embodiment of the present disclosure.

Some embodiments of the present disclosure will be described below based on the drawings.

Note that the drawings may contain exaggerated expressions or expressions that differ from the dimensional ratios of actual structures in order to aid understanding of the present disclosure. In addition, throughout the embodiments, the same or common elements are denoted by the same reference numerals, and overlapping explanations are omitted.

Figure 2:
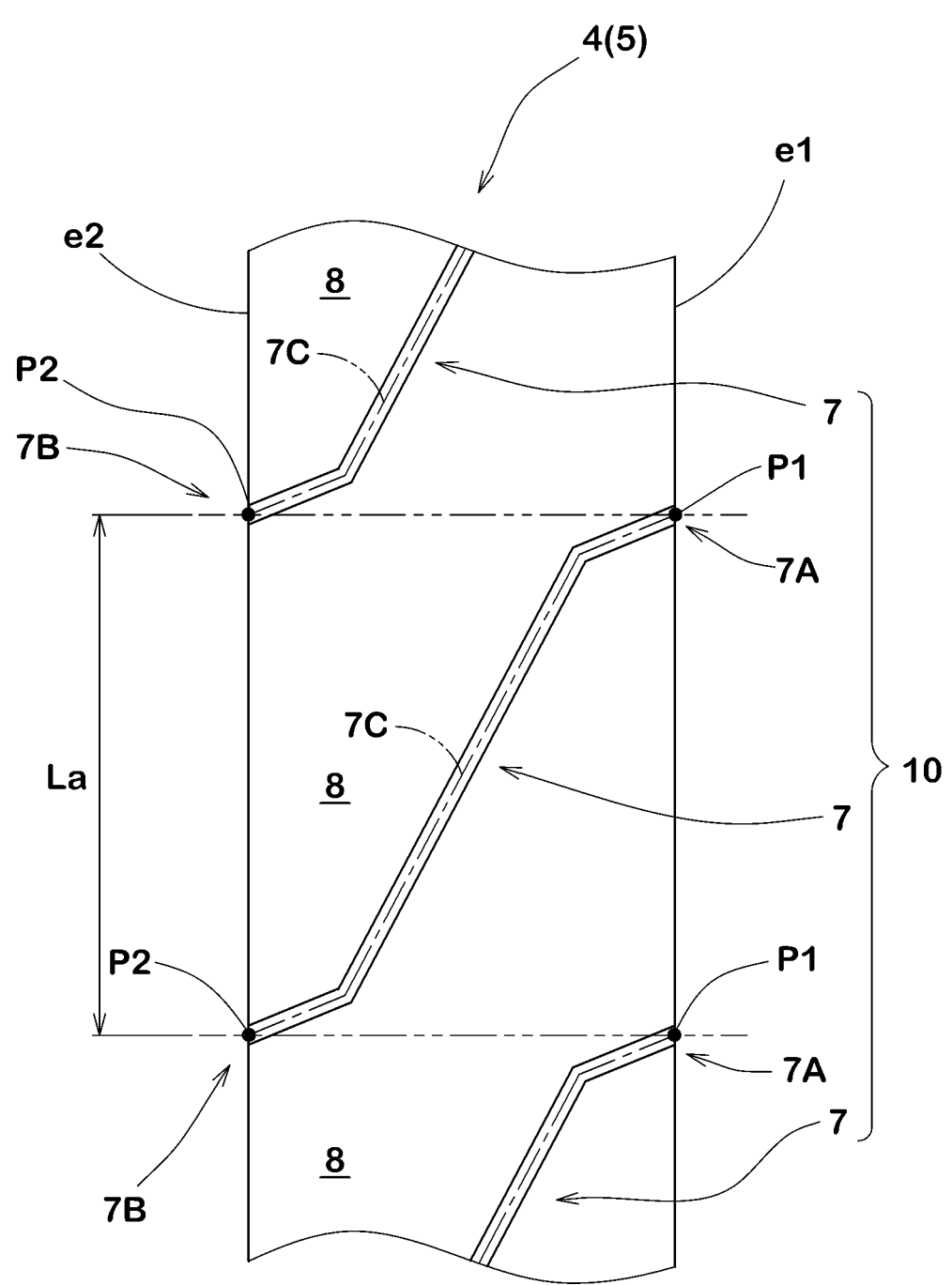
FIG. 2 is a partial enlarged view of a land portion of FIG. 1.

FIG. 1 is a partial development of the tread portion 2 of the tire 1 of the present embodiment, and FIG. 2 is an enlarged view of a main part of FIG. 1. As the tire according to the present embodiment, a pneumatic tire is exemplified. For example, as a pneumatic tire, a tire for passenger car tire may be suitable, especially a pneumatic radial tire for passenger car. The present disclosure may also be embodied as a motorcycle tire or a heavy-duty tire.

In FIG. 1, the tire 1 is under a normal state. As used herein, the "normal state" of the tire 1 is such that the tire 1 is mounted onto a standard wheel rim with a standard pressure but loaded with no tire load. Unless otherwise noted, dimensions of portions of the tire 1 are values measured under the normal state.

As used herein, the "standard wheel rim" is a wheel rim officially approved for each tire by standards organizations on which the tire is based, wherein the standard wheel rim is the "standard rim" specified in JATMA, the "Design Rim" in TRA, and the "Measuring Rim" in ETRTO, for example.

As used herein, the "standard pressure" is a standard pressure officially approved for each tire by standards organizations on which the tire is based, wherein the standard pressure is the "maximum air pressure" in JATMA, the maximum pressure given in the "Tire Load Limits at Various Cold Inflation Pressures" table in TRA, and the "Inflation Pressure" in ETRTO, for example.

As illustrated in FIG. 1, the tread portion 2 includes a first tread edge Te1, a second tread edge Te2, and a ground contact surface 2a therebetween. The ground contact surface 2a is a portion that is intended to be in contact with the ground and is formed by tread rubber. The first tread edge Te1 and the second tread edge Te2 are the axial outermost edges of the ground contact patch of the tire 1 which occurs under the condition such that the tire 1 under a normal loaded state.

As used herein, the "normal loaded state" is the condition in which the tire 1 is loaded with a standard tire load and is in contact with a flat surface at a zero camber angles. In addition, the "standard tire load" is a tire load officially approved for each tire by the standards organization in which the tire is based, wherein the standard tire load is the "maximum load capacity" in JATMA, the maximum value given in the above-mentioned table in TRA, and the "Load Capacity" in ETRTO, for example.

The tread portion 2, for example, is provided with a plurality (e.g., three) of circumferential grooves 3 extending in the tire circumferential direction. In the present embodiment, the circumferential grooves 3, for example, extend straight in parallel with the tire circumferential direction. Although not particularly limited, a width of the circumferential grooves 3, for example, is preferably greater than 2 mm, more preferably equal to or more than 3 mm, still further preferably equal to or more than 4 mm, in order to ensure sufficient drainage during wet driving. Similarly, a groove depth of the circumferential grooves 3, for example, is preferably equal to or more than 3 mm, preferably equal to or more than 4 mm, still further preferably equal to or more than 5 mm.

The tread portion 2 includes a plurality of land portions 4 sectioned by one or more circumferential grooves 3. In the present embodiment, the land portions 4 include a pair of crown land portions 5, and a pair of shoulder land portions 6 arranged outwardly in the tire axial direction of the pair of crown land portions 5. Note that the tire equator is denoted by reference "C".

In the following description of the land portions 4, one of the crown land portions 5 (e.g., one on the left side in FIG. 1) is referred to. The other land portions 4 may be constructed similarly or differently from the configurations described below.

The crown land portion 5 includes a circumferentially extending first edge e1, and a circumferentially extending second edge e2. In the present embodiment, the first edge e1 is one of the edges of the crown land portion 5 located on a first tread edge Te1 side, and the second edge e2 is the other one of the edges of the crown land portions 5 located on a second tread edge Te2 side. A ground contact surface of the crown land portion 5 is defined between the first edge e1 and the second edge e2.

The crown land portion 5 is provided with a plurality of lateral groove-shaped elements 7 inclined with respect to the tire axial direction and the tire circumferential direction. Thus, each of the plurality of the lateral groove-shaped elements 7 has a non-zero angle with respect to both the tire axial and circumferential directions.

As used herein, the lateral groove-shaped elements 7 are voids recessed from the ground contact surface of the land portion 4, for example, and mean an inclusive concept that includes both sipes and grooves. In the present embodiment of FIG. 1 and FIG. 2, the lateral groove-shaped elements 7 are shown as a plurality of sipes. Alternatively, the lateral groove-shaped elements 7 may be formed as a plurality of grooves.

As used herein, "sipe" means a slit-shaped void having a width of equal to or less than 2 mm, preferably equal to or less than 1.5 mm, orthogonal to the longitudinal direction thereof. Such a sipe, for example, can function such that at least a part of a pair of sipe walls contact with each other when the sipe is grounded under the normal loaded state. Thus, the sipe can help to minimize the stiffness reduction of the land portions 4 and, consequently, to improve the steering stability. As used herein, "groove" means a void having a length in a longitudinal direction thereof and a width greater than 2 mm orthogonal to the longitudinal direction. The maximum width of the grooves is not limited, but in the case of passenger car tires, for example, it may be equal to or less than 10 mm. Such a groove can help to improve drainage.

As illustrated in FIG. 2, each of the lateral groove-shaped elements 7 includes a first end 7A located on the first edge e1 and a second end 7B located on the second edge e2, and extends continuously therebetween. Thus, each of the lateral groove-shaped elements 7 extends so as to traverse the crown land portion 5 completely in the tire axial direction. Therefore, the land portion 4 is divided into a plurality of block-shaped land elements 8.

In the crown land portion 5, the plurality of lateral groove-shaped elements 7 is arranged in accordance with a first array 10. In the present embodiment, the crown land portion 5 is provided with a single set of the plurality of lateral groove-shaped elements 7 arranged in the first array 10. In some preferred embodiments, only a set of the plurality of lateral groove-shaped elements 7 arranged in the first array 10 is formed in the crown land portions 5.

In the first array 10, the plurality of lateral groove-shaped elements 7 is arranged repeatedly over the entire tire circumference of the crown land portion 5. Further, the first array 10 is such that the second end 7B of one of the lateral groove-shaped elements 7 is located at the same position in the tire circumferential direction as the first end 7A of another of the lateral groove-shaped elements 7. More specifically, as shown in FIG. 2, a first position P1 where the centerline 7C of one of the lateral groove-shaped elements 7 intersects the first edge e1 is located at the same position in the tire circumferential direction as a second position P2 where the centerline 7C of another of the lateral groove-shaped elements 7 adjacent to the above-mentioned lateral groove-shaped element 7 intersects the second edge e2. However, considering the characteristics of vulcanized rubber products such as tires, the first position P1 and the second position P2 may deviate from each other by a small distance (a) in the tire circumferential direction so that manufacturing errors can be tolerated. In this case, the distance (a) is equal to or less than 5%, preferably equal to or less than 3%, more preferably equal to or less than 1%, of a circumferential length La of the groove centerline of the lateral groove-shaped elements 7. In FIG. 2, no circumferential deviation is provided between the first and second positions P1 and P2.

Pitch noise is known as a noise that occurs when tires are running. An impact force is generated every time the land elements 8 divided by the lateral groove-shaped elements 7 come into contact with the ground. The repeated impact force causes the tread portion 2 and the sidewall (not shown) to vibrate periodically, resulting in pitch noise. However, in the first array 10 of the present embodiment, the arrangement pitches of the lateral groove-shaped elements 7 based on the centerlines 7C thereof are substantially equal to the respective tire circumferential lengths La of the lateral groove-shaped elements 7. As a result, the plurality of lateral groove-shaped elements 7 can be continuously and ceaselessly in contact with the ground during running, thereby reducing the variation in the impact force. Thus, the tire 1 according to the present embodiment can improve noise performance by reducing pitch noise.

Figure 3:
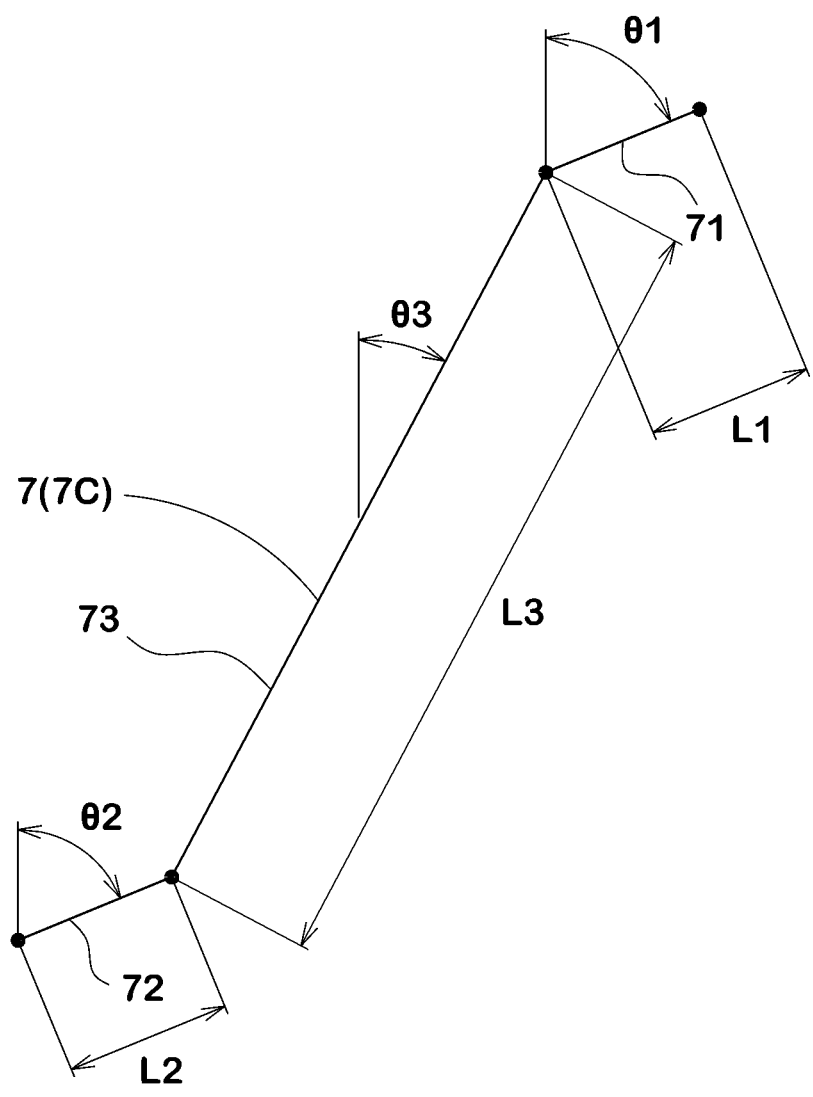
FIG. 3 is a diagram showing the centerline of one lateral groove-shaped element (sipes) in FIG. 1.

FIG. 3 is a diagram showing the centerline 7C of one lateral groove-shaped elements 7. Each of the plurality of lateral groove-shaped elements 7 includes a first portion 71 on a first end 7A side, a second portion 72 on a second end e2 side, and a third portion 73 between the first portion 71 and the second portion 72. The first portion 71, the second portion 72, and the third portion 73 are inclined in the same direction with respect to the tire circumferential direction. In the present embodiment, the first portion 71, the second portion 72, and the third portion are all extend up to the right with respect to the tire circumferential direction, for example. Such lateral groove-shaped elements 7 are advantageous to improve the running noise compared to those extending parallel to the tire axial direction, because the lateral groove-shaped elements 7 are gradually in contact with the ground from one end to the other end in the longitudinal direction of each the lateral groove-shaped elements 7.

As illustrated in FIG. 3, an angle $\theta 3$ of the third portion 73 with respect to the tire circumferential direction is smaller than an angle $\theta 1$ of the first portion 71 with respect to the tire circumferential direction and an angle $\theta 2$ of the second portion 72 with respect to the tire circumferential direction. In addition, a length L3 of the third portion 73 is greater than a sum (L1+L2) of a length L1 of the first portion 71 and a length L2 of the second portion L2.

As to the angle of the lateral groove-shaped elements 7 with respect to the tire circumferential direction, the larger angle works to the advantage of steering stability. In addition, when cornering of the tire, force that acts on the first edge e1 and the second edge e2 of the land portion 4 increase. In this embodiment, since the angles $\theta 1$ and $\theta 2$ of the first portion 71 and the second portion 72, respectively, which are located at both ends of the land portion 4, are larger than the angle $\theta 3$ of the third portion 73, the steering stability can be improved. Further, since the third portion 73, which has a steeper slope, has the length L3 greater than the sum (L1+L2) of the lengths L1 and L2 of the first portion 71 and the second portion 72, respectively, the land elements 8 are difficult to twist when cornering. These effects can improve steering stability of the tire 1 in the present embodiment. When the lateral groove-shaped elements 7 are sipes, as in the present embodiment, by bending the lateral groove-shaped elements 7 as described above, the adjacent land elements 8 via the sipe can support with each other when cornering, and thus the steering stability can be further improved.

From the viewpoint of more effectively suppressing the twisting deformation of the land elements 8 described above, the length L3 of the third portion 73 is preferably longer. For example, the length L3 of the third portion 73 is preferably equal to or more than 1.2 times the sum (L1+L2) of the length L1 of the first portion 71 and the length L2 of the second portion 72, more preferably equal to or more than 1.5 times, still further preferably equal to or more than 2.0 times. Further, from the viewpoint of securing sufficient lateral rigidity near the first edge e1 and the second edge e2 of the land portion 4, the length L3 of the third portion 73 is equal to or less than 3.5 times the sum (L1+L2), more preferably equal to or more less than 3.0 times, for example. In some more preferred embodiments, the length L1 of the first portion 71 and the length L2 of the second portion 72 are equal to each other (L1=L2). Alternatively, the length L1 may be different from the length L2.

The angle $\theta 1$ of the first portion 71 and the angle $\theta 2$ of the second portion 72 are not particularly limited, but from the viewpoint of improving steering stability, for example, they may be set to be equal to or more than 60 degrees, more preferably equal to or more than 65 degrees, still further preferably equal to or more than 70 degrees. The upper limit of the angle $\theta 1$ of the first portion 71 and the angle $\theta 2$ of the second portion 72 is preferably equal to or less than 90 degrees, more preferably equal to or less than 85 degrees, still further preferably equal to or less than 80 degrees. In some preferred embodiments, the angle $\theta 1$ and the angle $\theta 2$ are equal to each other ($\theta 1=\theta 2$). Alternatively, the angle $\theta 1$ may be different from the angle $\theta 2$.

The angle $\theta 3$ of the third portion 73 is not particularly limited as long as it is smaller than the angle $\theta 1$ of the first portion 71 and the angle $\theta 2$ of the second portion 72. In order to tightly engage the adjacent land elements 8 with each other for higher steering stability when cornering, the angle $\theta 3$ of the third portion 73 is preferably equal to or more than 20 degrees, more preferably equal to or more than 30 degrees, but preferably equal to or less than 50 degrees, more preferably equal to or less than 40 degrees.

Figure 4:
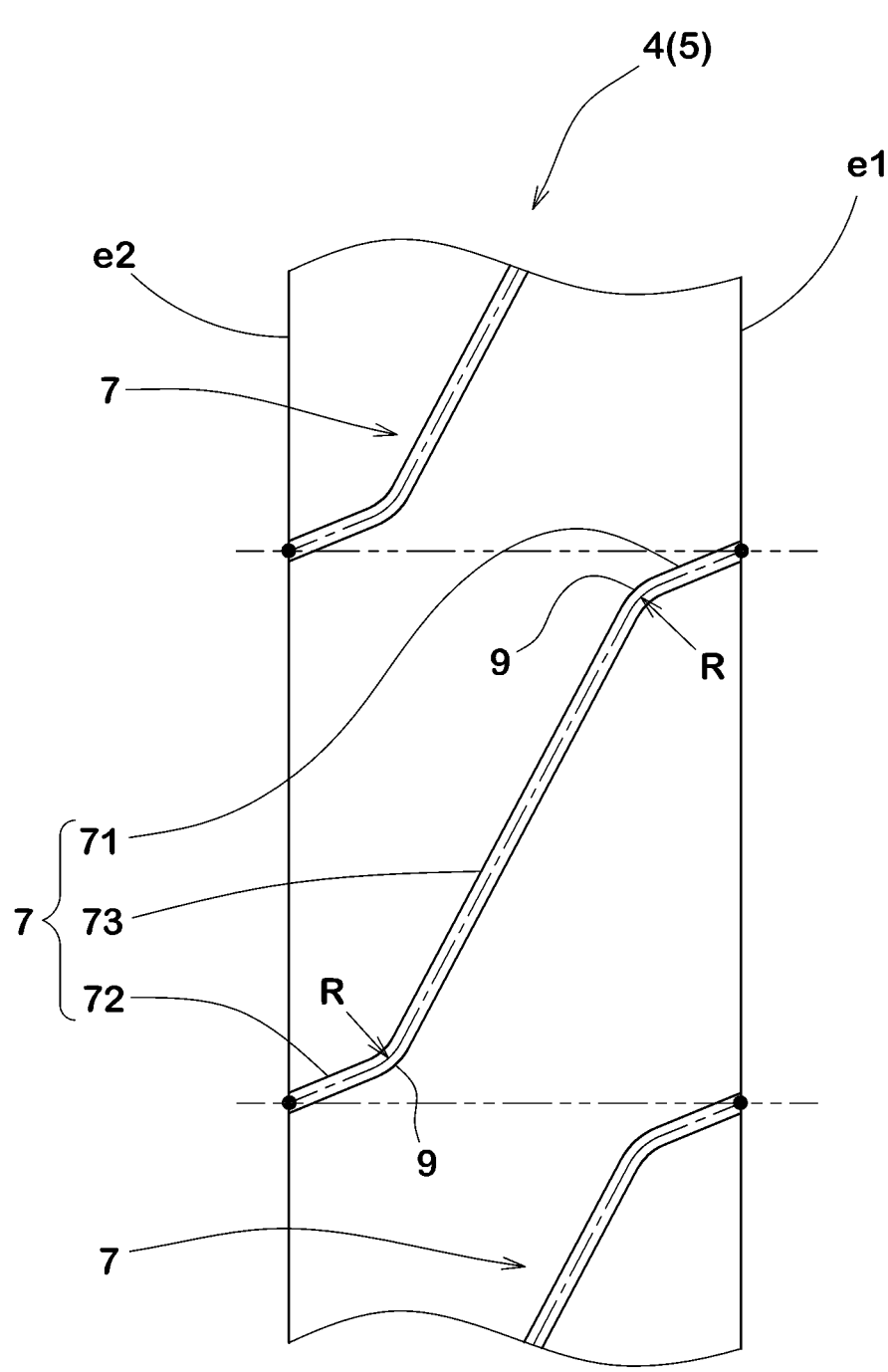
FIG. 4 is a plan view of the land portion showing another embodiment of the lateral groove-shaped elements.

In the embodiment shown in FIGS. 1 and 2, the first portion 71, the second portion 72, and the third portion 73 extend straight and are directly connected with one another without an intervening an arc portion. In another embodiment, an arc portion 9 of radius of curvature R may be arranged between the first portion 71 and the third portion 73 and/or between the third portion 73 and the second portion 72, as shown in FIG. 4. In the embodiment such as FIG. 4, the lengths of the first portion 71, the second portion 72 and the third portion 73 shall be specified with respect to their intersections by virtual extension of their respective centerlines.

Figure 5:
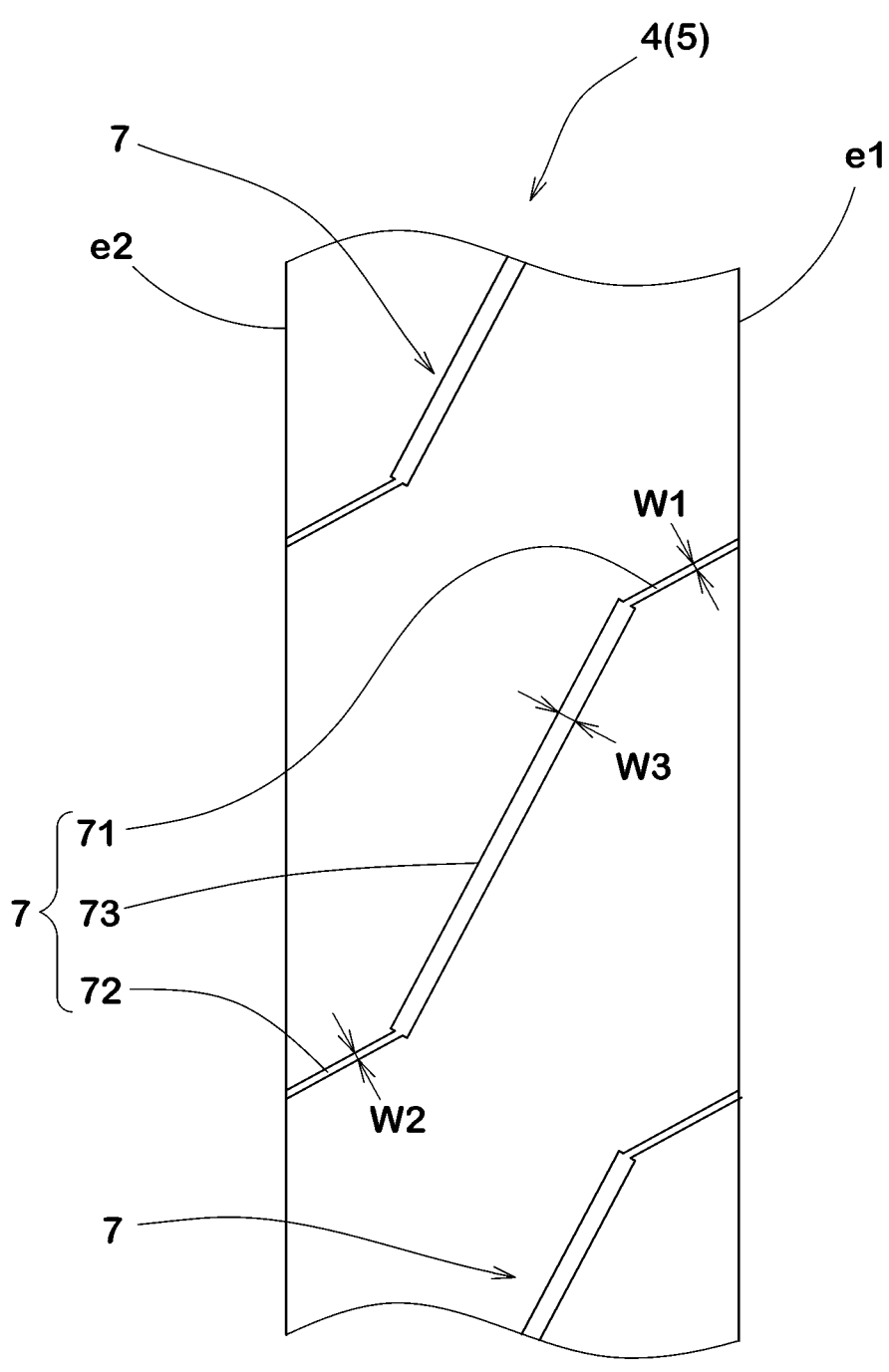
FIG. 5 is a plan view of the land portion showing yet another embodiment of the lateral groove-shaped elements.

FIG. 5 illustrates a modification of the lateral groove-shaped elements 7. In the modification of FIG. 5, a width W1 of the first portion 71 and a width W2 of the second portion 72 are smaller than a width W3 of the third portion 73. That is, the widths W1 and W2 of the first portion 71 and the second portion 72 with the angles $\theta 1$ and $\theta 2$ relatively large with respect to the tire circumferential direction are smaller than the width W3 of the third portion 73 with the angle $\theta 3$ relatively small. In such a modification, the widths of the first portion 71 and the second portion 72 and the third portion 73 are similar or equal to each other in a cross-section of the land portion perpendicular to the ground contact surface of the land portion 4 and parallel to the tire axial direction. This can help further reduce the variation of the impact force when the tire is running and to further improve the noise performance.

Figure 6:
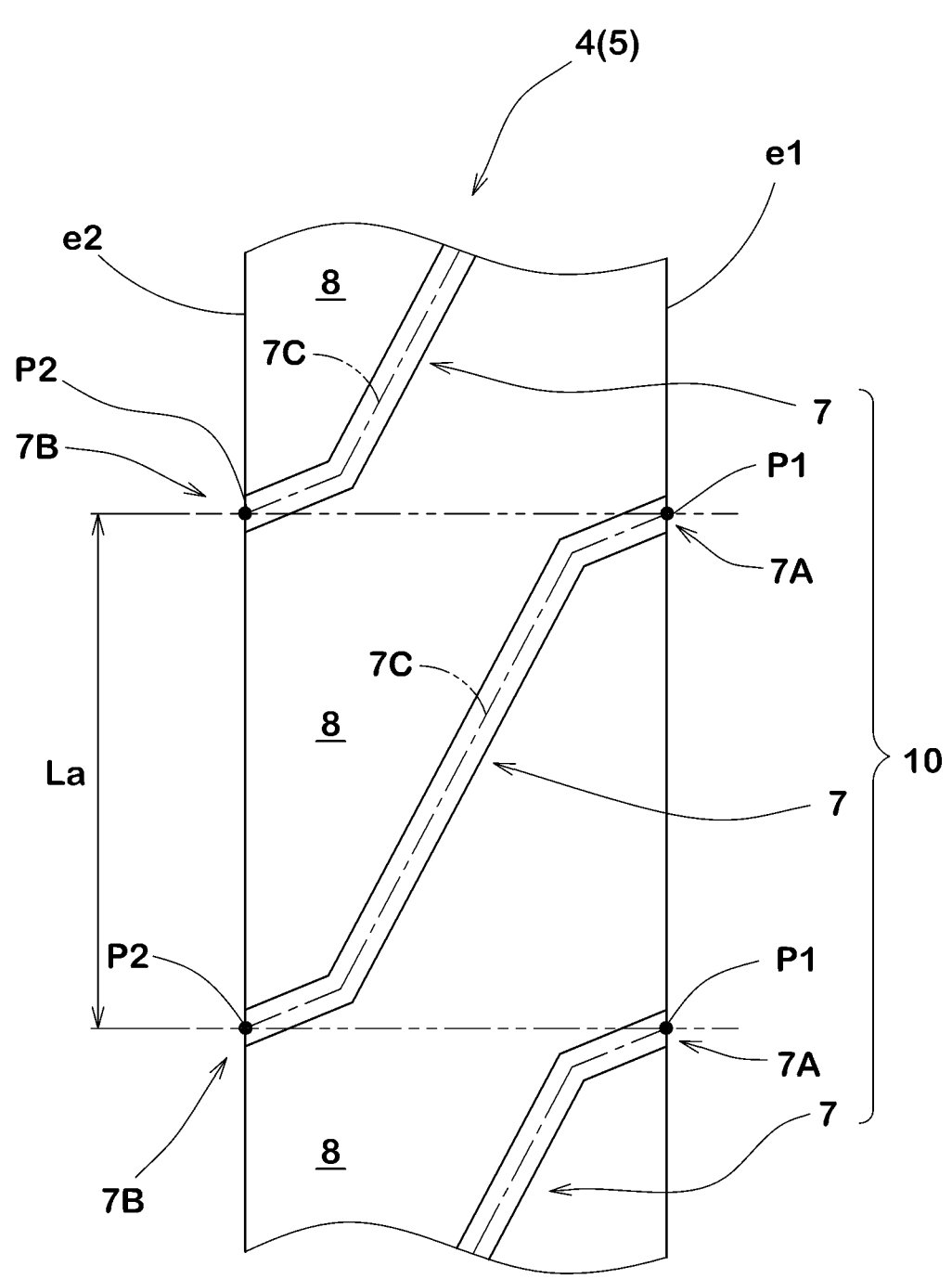
FIG. 6 is a plan view of the land portion showing yet another embodiment of the lateral groove-shaped elements.

FIG. 6 illustrates another modification of the lateral groove-shaped elements 7. In this modification, the lateral groove-shaped elements 7 are lateral grooves. The lateral groove-shaped elements 7 of the present disclosure are not limited to sipes, but can be lateral grooves.

Figure 7:
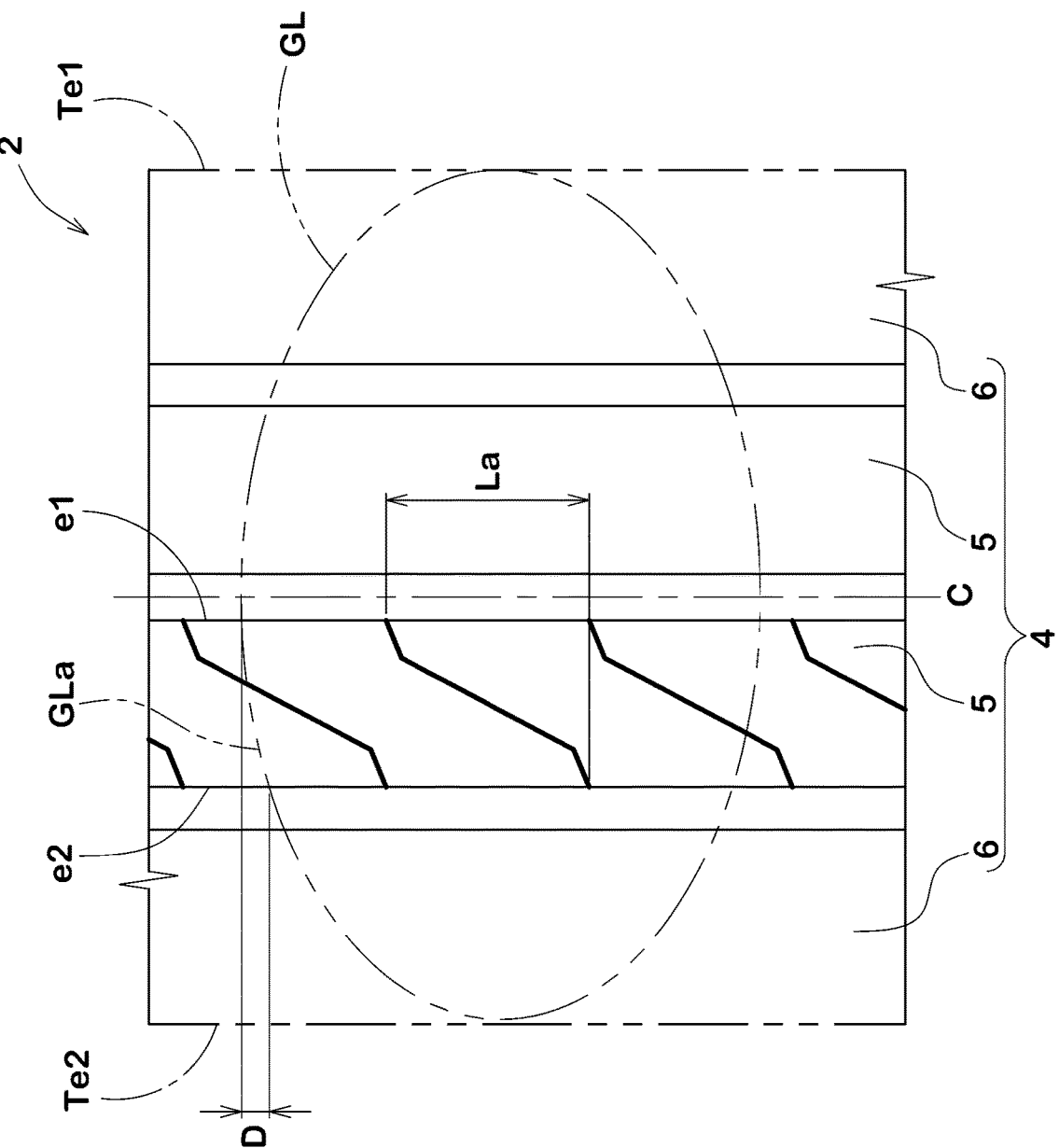
FIG. 7 is a plan view of a tread portion showing a ground contact patch thereof.

FIG. 7 shows a ground contact patch GL of the tire under a normal loaded state with a virtual line. As illustrated in FIG. 7, a tire circumferential length D of an edge GLa of the ground contact patch GL that crosses the land portion 4, which is provided with the first array 10, is equal to or less than 20% of the circumferential length La of one of the plurality of lateral groove-shaped elements 7. The inventors focused on the relationship between the circumferential length La of the lateral groove-shaped elements 7 and the tire circumferential length D of the edge GLa of the ground contact patch GL in order to obtain a higher noise improvement effect. In order to obtain the expected effect of the first array 10 on the suppression of impact force fluctuations, it may be most effective if the edge GLa of the ground contact patch GL crossing the land portion 4 is parallel to the tire axial direction. However, in actual tires, the edge GLa of the ground contact patch GL tends to be an arc-shape, as shown in FIG. 7. Even in such an actual case, when the tire circumferential length D of the edge GLa of the ground contact patch GL is equal to or less than 20% of the circumferential length La of one of the lateral groove-shaped elements 7, the deviation of the ground contact timing between the first edge e1 and the second edge e2 of the land portion 4 becomes as small as possible. This can help further reduce the impact force fluctuations and further improve the noise performance. In some more preferred aspects, the tire circumferential length D of the edge GLa of the ground contact patch GL is equal to or less than 10%, more preferably equal to or less than 5%, of the circumferential length La of one of the lateral groove-shaped elements 7.

Figure 8:
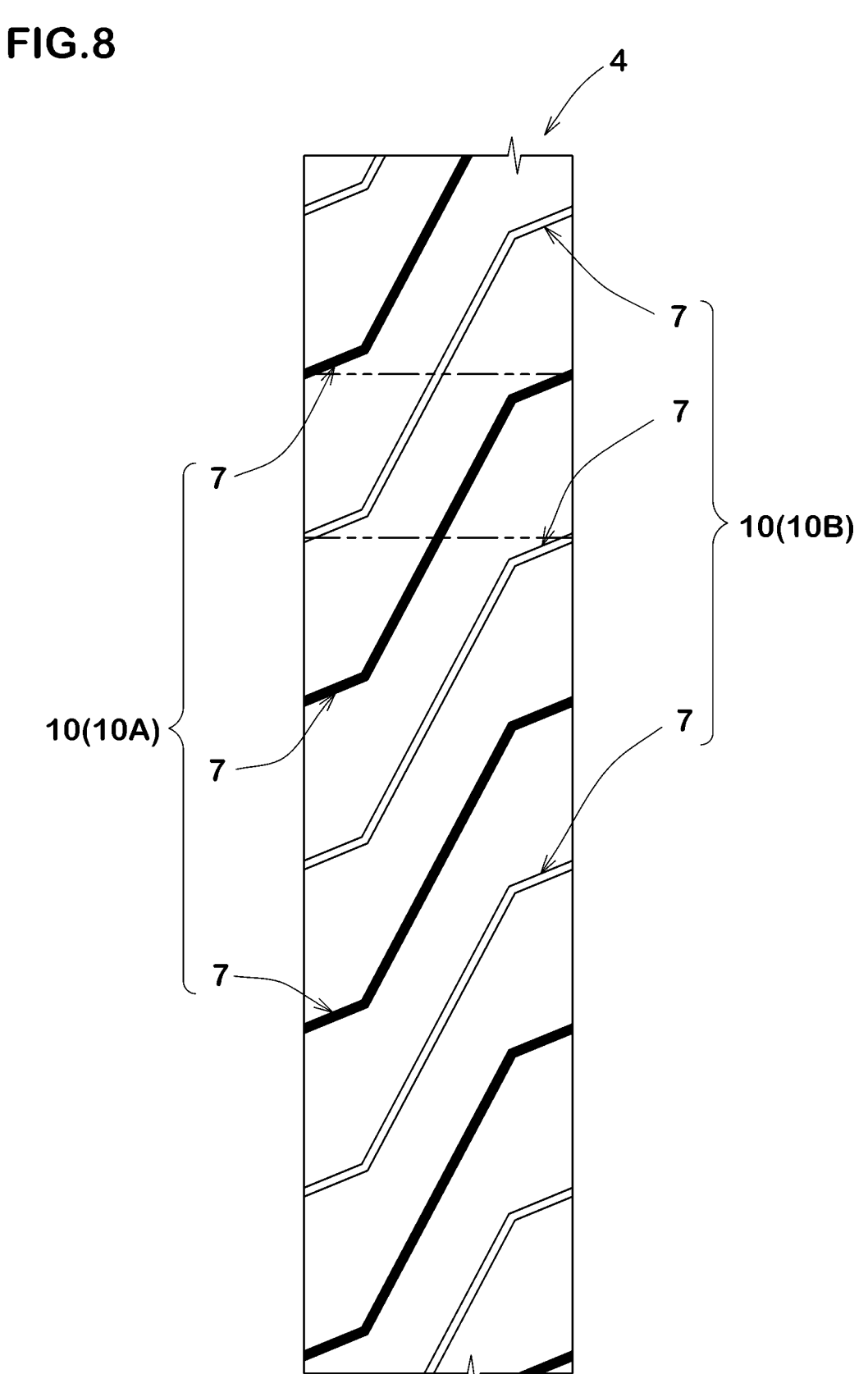
FIG. 8 is a plan view of the land portion provided with a plurality of sets of lateral groove-shaped elements arranged in the first array.

FIG. 8 illustrates yet another embodiment. In this embodiment, the (single) land portion 4 is provided with a plurality of sets of the lateral groove-shaped elements arranged in the first array 10. Specifically, the sets include two first arrays 10 which include one first array 10A and another first array 10B. In such an embodiment, the pitch noise can be reduced to improve the noise performance as well as the steering stability. In each of the first arrays 10A and 10B according to the present embodiment, the lateral groove-shaped elements 7 are arranged at a pitch that is equal to the circumferential length La (shown in FIG. 2) of the lateral groove-shaped elements 7. In addition, the plurality of first arrays 10A and 10B are displaced from one another in the tire circumferential direction by a length of 50% of the pitch. Such an embodiment can help reduce the above-mentioned impact force fluctuations and further improve the noise performance.

Although some embodiments of the present disclosure have been described above, the embodiments and the specific configurations represented in the drawings are for the purpose of understanding the contents of the present disclosure, and the present disclosure is not limited to the specific configurations shown in the figures. Further, in the above embodiments, one of the crown land portions 5 is taken as an example of the land portion to be provided with the first array of lateral groove-shaped elements 7, but the lateral groove-shaped elements 7 may be formed not in the crown land portion 5 (or with the crown land portion 5) but in one or more shoulder land portions 6.

EXAMPLE

In order to confirm the effects of the present disclosure, pneumatic radial tires for passenger cars with a tire size of 195/65R15 91H (mounted rim: 15×6.0, internal pressure: 230 kPa) based on the specifications in Table 1 were prepared, and steering stability and noise performance were tested. The first array of the specifications in Table 1 was applied to all land portions. The internal structures of the tires were the same.

Noise Performance Test (Actual Vehicle Evaluation):
Test tires were mounted on the four wheels of a test vehicle (front-wheel drive vehicle with a displacement of 2000 cc). Then, the test vehicle was run on a dry road surface at a speed of 40 to 100 km/h, and the maximum sound pressure of the noise at this time was measured. The test results are indicated in Table 1 using an index with the sound pressure of Reference being 100, and the smaller the value, the smaller the running noise (lower the sound pressure) and the better the noise performance.

Steering Stability Test:
Test tires were mounted on the four wheels of the test vehicle. Then, the test vehicle was run on an asphalt circuit, and the steering stability at that time was evaluated by the driver's sensory perception. The test results are indicated in Table 1 using a score with Reference being 100, and the higher the value, the better the steering stability.

Table 1 shows the test results.

TABLE 1

| Specification of lateral groove-shaped elements | Reference | Example |
|---|---|---|
| Angle θ1 of first portions (deg.) | 36 | 75 |
| Length L1 of first portions (mm) | 36 | 5 |
| Width W1 of first portions (mm) | 1.9 | 1 |
| Angle θ3 of third portions (deg.) | — | 23 |
| Length L3 of third portions (mm) | — | 29 |
| Width W3 of third portions (mm) | — | 3 |
| Angle θ2 of second portions (deg.) | — | 75 |
| Length L2 of second portions (mm) | — | 5 |
| Width W2 of second portion (mm) | — | 1 |
| Ratio L3/(L1 + L2) | — | 2.9 |
| Noise performance (index) | 100 | 100 |
| Steering stability (score) | 100 | 150 |

As a result of the test, it is confirmed that Example can improve steering stability without sacrificing noise performance compared to Reference.

[Additional Note]
The present disclosure includes the following aspects.
[Note 1]
A tire comprising:
a tread portion comprising at least one land portion, wherein
the a least one land portion comprises a circumferentially extending first edge, a circumferentially extending second edge, and at least one set of plurality of lateral groove-shaped elements,
each of the plurality of lateral groove-shaped elements extends continuously from a first end thereof located on the first edge to a second end thereof located on the second edge and is inclined with respect to a tire axial direction and a tire circumferential direction,
the at least one set of the plurality of lateral groove-shaped elements is arranged in a first array over an entire circumference of the at least one land portion,
in the first array, the plurality of lateral groove-shaped elements is arranged repeatedly in the tire circumferential direction such that the second end of one of the lateral groove-shaped elements is located at a same position in the tire circumferential direction as the first end of another of the lateral groove-shaped elements,
each of the plurality of lateral groove-shaped elements comprises a first portion on a first end side, a second portion on a second end side, and a third portion between the first portion and the second portion,
the first portion, the second portion, and the third portion are inclined in a same direction with respect to the tire circumferential direction,
an angle θ3 of the third portion with respect to the tire circumferential direction is smaller than an angle θ1 and an angle θ2 of the first and second portions, respectively, with respect to the tire circumferential direction, and
a length of the third portion is greater than a sum of a length of the first portion and a length of the second portion.

[Note 2]

The tire according to note 1, wherein
the plurality of lateral groove-shaped elements is a plurality of sipes having a width equal to or less than 2 mm.

[Note 3]

The tire according to note 1, wherein
the plurality of lateral groove-shaped elements is a plurality of grooves having a width greater than 2 mm.

[Note 4]

The tire according to any one of notes 1 to 3, wherein
a width of the first portion and a width of the second portion are smaller than a width of the third portion.

[Note 5]

The tire according to any one of notes 1 to 4, wherein
the angle $\theta 1$ is equal to the angle $\theta 2$.

[Note 6]

The tire according to any one of notes 1 to 5, wherein
in a ground contact patch of the tire under a normal loaded state in which the tire is mounted on a standard wheel rim with a standard pressure and is in contact with a flat surface with a zero camber angles under a standard tire load, a tire circumferential length of an edge of the ground contact patch that crosses the at least one land portion is equal to or less than 20% of a tire circumferential length of one of the plurality of lateral groove-shaped elements.

[Note 7]

The tire according to any one of notes 1 to 6, wherein
the at least one set comprises two or more sets of the plurality of lateral groove-shaped elements arranged in the first array.

The invention claimed is:

1. A tire comprising:
a tread portion comprising at least one land portion, wherein
the at least one land portion comprises a circumferentially extending first edge, a circumferentially extending second edge, and at least one set of plurality of lateral groove-shaped elements,
each of the plurality of lateral groove-shaped elements extends continuously from a first end thereof located on the first edge to a second end thereof located on the second edge and is inclined with respect to a tire axial direction and a tire circumferential direction,
the at least one set of the plurality of lateral groove-shaped elements is arranged in a first array over an entire circumference of the at least one land portion,
in the first array, the plurality of lateral groove-shaped elements is arranged repeatedly in the tire circumferential direction such that the second end of one of the lateral groove-shaped elements is located at a same position in the tire circumferential direction as the first end of another of the lateral groove-shaped elements,
each of the plurality of lateral groove-shaped elements comprises a first portion on a first end side, a second portion on a second end side, and a third portion between the first portion and the second portion,
the first portion, the second portion, and the third portion are inclined in a same direction with respect to the tire circumferential direction,
an angle $\theta 3$ of the third portion with respect to the tire circumferential direction is smaller than an angle $\theta 1$ and an angle $\theta 2$ of the first and second portions, respectively, with respect to the tire circumferential direction, a length of the third portion is greater than a sum of a length of the first portion and a length of the second portion,
the length of the third portion is equal to or more than 2.0 times the sum of the length of the first portion and the length of the second portion,
each of the plurality of lateral groove-shaped elements is a groove in which the first, second, and third portions each have a width greater than 2 mm, and
the entire first edge, except at the first ends, extends straight in parallel with the tire circumferential direction over an entire circumference of the tire.

2. The tire according to claim 1, wherein
a width of the first portion and a width of the second portion are smaller than a width of the third portion.

3. The tire according to claim 2, wherein
in a ground contact patch of the tire under a normal loaded state in which the tire is mounted on a standard wheel rim with a standard pressure and is in contact with a flat surface with a zero camber angles under a standard tire load, a tire circumferential length of an edge of the ground contact patch that crosses the at least one land portion is equal to or less than 20% of a tire circumferential length of one of the plurality of lateral groove-shaped elements.

4. The tire according to claim 1, wherein
the angle $\theta 1$ is equal to the angle $\theta 2$.

5. The tire according to claim 4, wherein
in a ground contact patch of the tire under a normal loaded state in which the tire is mounted on a standard wheel rim with a standard pressure and is in contact with a flat surface with a zero camber angles under a standard tire load, a tire circumferential length of an edge of the ground contact patch that crosses the at least one land portion is equal to or less than 20% of a tire circumferential length of one of the plurality of lateral groove-shaped elements.

6. The tire according to claim 1, wherein
in a ground contact patch of the tire under a normal loaded state in which the tire is mounted on a standard wheel rim with a standard pressure and is in contact with a flat surface with a zero camber angles under a standard tire load, a tire circumferential length of an edge of the ground contact patch that crosses the at least one land portion is equal to or less than 20% of a tire circumferential length of one of the plurality of lateral groove-shaped elements.

7. The tire according to claim 1, wherein
the at least one set comprises two or more sets of the plurality of lateral groove-shaped elements arranged in the first array.

8. The tire according to claim 1, wherein
the angle $\theta 3$ of the third portion with respect to the tire circumferential direction is in a range from 20 to 50 degrees, and
the angle $\theta 1$ and the angle $\theta 2$ of the first and second portions, respectively, with respect to the tire circumferential direction are in a range from 60 to 90 degrees.

9. The tire according to claim 1, wherein
the length of the third portion is equal to or less than 3.5 times the sum of the length of the first portion and the length of the second portion.

10. The tire according to claim 1, wherein
the first portion comprises a portion extending straight, the second portion comprises a portion extending straight, and the third portion comprises a portion extending straight.

11. The tire according to claim 10, wherein the first portion, the second portion, and the third portion are directly connected with one another without an intervening an arc portion therebetween.

12. The tire according to claim 10, wherein the first portion, the second portion, and the third portion are connected with one another via an arc portion therebetween.

13. The tire according to claim 1, wherein the at least one land portion is provided with only a single set of the plurality of lateral groove-shaped elements.

14. A tire comprising:

a tread portion comprising at least one land portion, wherein the at least one land portion comprises a circumferentially extending first edge, a circumferentially extending second edge, and at least one set of plurality of lateral groove-shaped elements, each of the plurality of lateral groove-shaped elements extends continuously from a first end thereof located on the first edge to a second end thereof located on the second edge and is inclined with respect to a tire axial direction and a tire circumferential direction, the at least one set of the plurality of lateral groove-shaped elements is arranged in a first array over an entire circumference of the at least one land portion, in the first array, the plurality of lateral groove-shaped elements is arranged repeatedly in the tire circumferential direction such that the second end of one of the lateral groove-shaped elements is located at a same position in the tire circumferential direction as the first end of another of the lateral groove-shaped elements, each of the plurality of lateral groove-shaped elements comprises a first portion on a first end side, a second portion on a second end side, and a third portion between the first portion and the second portion, the first portion, the second portion, and the third portion are inclined in a same direction with respect to the tire circumferential direction, an angle $\theta 3$ of the third portion with respect to the tire circumferential direction is smaller than an angle $\theta 1$ and an angle $\theta 2$ of the first and second portions, respectively, with respect to the tire circumferential direction, a length of the third portion is greater than a sum of a length of the first portion and a length of the second portion, the length of the third portion is equal to or more than 2.0 times the sum of the length of the first portion and the length of the second portion, each of the plurality of lateral groove-shaped elements is a groove in which the first, second, and third portions each have a width greater than 2 mm, and a width of the first portion and a width of the second portion are smaller than a width of the third portion.

\* \* \* \* \*